/

US008237717B2

(12) United States Patent
Kurokawa

(10) Patent No.: US 8,237,717 B2
(45) Date of Patent: Aug. 7, 2012

(54) VECTOR IMAGE DRAWING DEVICE, METHOD FOR VECTOR IMAGE DRAWING, AND COMPUTER READABLE RECORDING MEDIUM

(75) Inventor: Takafumi Kurokawa, Osaka (JP)

(73) Assignee: NEC System Technologies, Ltd., Osaka (JP)

( * ) Notice: Subject to any disclaimer, the term of this patent is extended or adjusted under 35 U.S.C. 154(b) by 758 days.

(21) Appl. No.: 12/213,981

(22) Filed: Jun. 26, 2008

(65) Prior Publication Data

US 2009/0040230 A1    Feb. 12, 2009

(30) Foreign Application Priority Data

Jun. 27, 2007  (JP) ................ P2007-169758

(51) Int. Cl.
*G06T 11/00*    (2006.01)
(52) U.S. Cl. ........ 345/441; 345/442; 345/443; 345/502; 345/505; 345/506; 345/620; 345/624; 345/625; 345/626; 345/627; 345/628; 345/629; 345/634; 345/641; 345/644
(58) Field of Classification Search .......... 345/441–443, 345/502, 505, 506, 620, 624–629, 634, 641, 345/644
See application file for complete search history.

(56) References Cited

U.S. PATENT DOCUMENTS

| 4,731,606 | A | * | 3/1988 | Bantz et al. | 345/625 |
| 4,939,671 | A | * | 7/1990 | Sasser | 345/443 |
| 5,946,000 | A | * | 8/1999 | Hoel | 345/442 |
| 6,373,491 | B1 | * | 4/2002 | Sasaki | 345/443 |
| 2003/0052896 | A1 | * | 3/2003 | Higgins et al. | 345/619 |
| 2006/0044317 | A1 | | 3/2006 | Bourd et al. | |

FOREIGN PATENT DOCUMENTS

| GB | 2 404 316 A | 1/2005 |
| JP | 04-057177 | 2/1992 |

(Continued)

OTHER PUBLICATIONS

E. Hsieh, et al., "ZR: A 3D API Transparent Technology for Chunk Rendering," Microarchitecture, 2001, Micro-34 Proceedings of 34th ACM/IEEE International Symposium, Dec. 1-5, 2001, pp. 284-291.

*Primary Examiner* — Xiao M. Wu
*Assistant Examiner* — Todd Buttram
(74) *Attorney, Agent, or Firm* — Foley & Lardner LLP

(57) ABSTRACT

Where each of m and n are any natural number: a drawing region subdivider 5 for subdividing a drawing region into an m×n matrix of drawing subregions having m rows and n columns,; a target vector data selector 6 for discriminating, for each of the drawing subregions, vector data necessary for drawing the drawing subregion from vector data of an image; and a subdivisional drawer 7 for drawing, for each of the drawing subregions after the subdivision by the drawing region subdivider 5, an image based on a drawing subregion target vector data 23 discriminated by the target vector data selector 6 are provided as necessary for drawing the drawing subregion. Preferably, a curve vector data replacer 71 of the subdivisional drawer 7, for each of the drawing subregions, replaces curve vector data outside of the drawing subregion from vector data configuring a figure to be subdivisionally drawn with straight-line vector data and performs a fill processing.

9 Claims, 10 Drawing Sheets

FOREIGN PATENT DOCUMENTS

| | | |
|---|---|---|
| JP | 04-342084 | 11/1992 |
| JP | 05-046778 | 2/1993 |
| JP | 06-168337 | 6/1994 |
| JP | 06-168339 | 6/1994 |
| JP | 08-241420 | 9/1996 |
| JP | 09-005107 | 1/1997 |
| JP | 2003-099027 A | 4/2003 |
| WO | WO 01/095257 A1 | 12/2001 |
| WO | WO 2004/086309 A2 | 10/2004 |

* cited by examiner

VECTOR IMAGE DRAWING DEVICE, METHOD FOR VECTOR IMAGE DRAWING, AND COMPUTER READABLE RECORDING MEDIUM

BACKGROUND OF THE INVENTION

1. Field of the Invention

The present invention relates to a drawing device, a method for drawing, and a computer readable recording medium for displaying a vector image.

2. Description of the Related Art

Image data displayed on a display device includes raster data that stores information for each of a plurality of pixels arranged in two dimensions and vector data that stores line information.

Raster data includes color and luminance data for each pixel. Vector data includes, for example, data such as a start point and an end point of a line segment, a combination of orders of functions and points for defining a curve, and data for specifying an arc.

Generally, images made from raster data are called raster images, and images made from vector data are called vector images.

In the case where a raster image is enlarged and displayed, each pixel unit is enlarged and displayed without a calculation, and therefore the roughness of the image is highly visible. On the other hand, in the case where a vector image is enlarged and displayed, a calculation is performed according to the resolution, and therefore a smooth image is displayed. For example, an outline font is an example of a group of typeface characters (also known as a font) that stores vector data and produces a smooth display when enlarged or reduced.

A raster image simply stores the color and luminance data of all of the pixels, and therefore fill regions of figures also are displayed as is. On the other hand, for vector images, a closed figure represented by vector data specifies a region to be filled. To display the fill region, the pixels included in the region are determined, and the pixels of the region are given a specified color and luminance. In the case where figures overlap, intersections and overlapping regions are calculated from the vector data, and pixels to be filled are defined.

For example, Japanese Published Unexamined Patent Application No. 2003-099027 discusses technology for displaying a fill region even in the case when a portion or an entirety of a boundary of the fill region is outside of the display area. The technology discussed in this Patent Reference includes: a fill line drawer for calculating coordinates of drawing points forming a boundary, writing image data to image memory corresponding to the coordinates in the case where the coordinates are inside the display area, and writing image data to image memory corresponding to the left edge of the display area at the same y coordinates when x coordinates of the calculated drawing points are beyond the left side of the display area; and a fill processor for storing display data in a display memory based on the image data written to image memory.

SUMMARY OF THE INVENTION

According to the technology recited above, in the case where a vector image is drawn, a figure is drawn by storing intersection information of the vector data for each scanning line and determining the presence of a fill region based on the information. However, in the case where the intersection information of each scanning line increases, correct drawing unfortunately is not possible unless sufficient memory is set aside for storing the information.

The present invention resolves the problems recited above, and provides a vector image drawing device, a method for vector image drawing, and a computer readable recording medium for correctly drawing a vector image even with low memory capacity.

To achieve the objects recited above, a vector image drawing device according to a first aspect of the present invention comprises:

a subdivider for subdividing a drawing region into an m×n matrix of drawing subregions having m rows and n columns, where each of m and n is any natural number;

a selector for selecting, for each of the drawing subregions, vector data necessary for drawing the drawing subregion from vector data of an image; and a subdivisional drawer for drawing, for each of the drawing subregions subdivided by the subdivider, an image based on the vector data selected by the selector.

To achieve the objects recited above, a method for vector image drawing according to a second aspect of the present invention comprises:

a subdivision step for subdividing a drawing region into an m×n matrix of drawing subregions having m rows and n columns, where each of m and n is any natural number;

a selection step for selecting, for each of the drawing subregions, vector data required for drawing the drawing subregion from vector data of an image; and a subdivisional drawing step for drawing, for each of the drawing subregions subdivided by the subdivision step, an image based on the vector data selected in the selection step.

To achieve the objects recited above, a computer readable recording medium according to a third aspect of the present invention records a program for causing a computer to execute:

a subdivision step for subdividing a drawing region into an m×n matrix of drawing subregions having m rows and n columns, where each of m and n is any natural number;

a selection step for selecting, for each of the drawing subregions, vector data necessary for drawing the drawing subregion from vector data of an image; and a subdivisional drawing step for drawing, for each of the drawing subregions subdivided in the subdivision step, an image based on the vector data selected in the selection step.

DETAILED DESCRIPTION OF THE PREFERRED EMBODIMENTS

Figure 1:
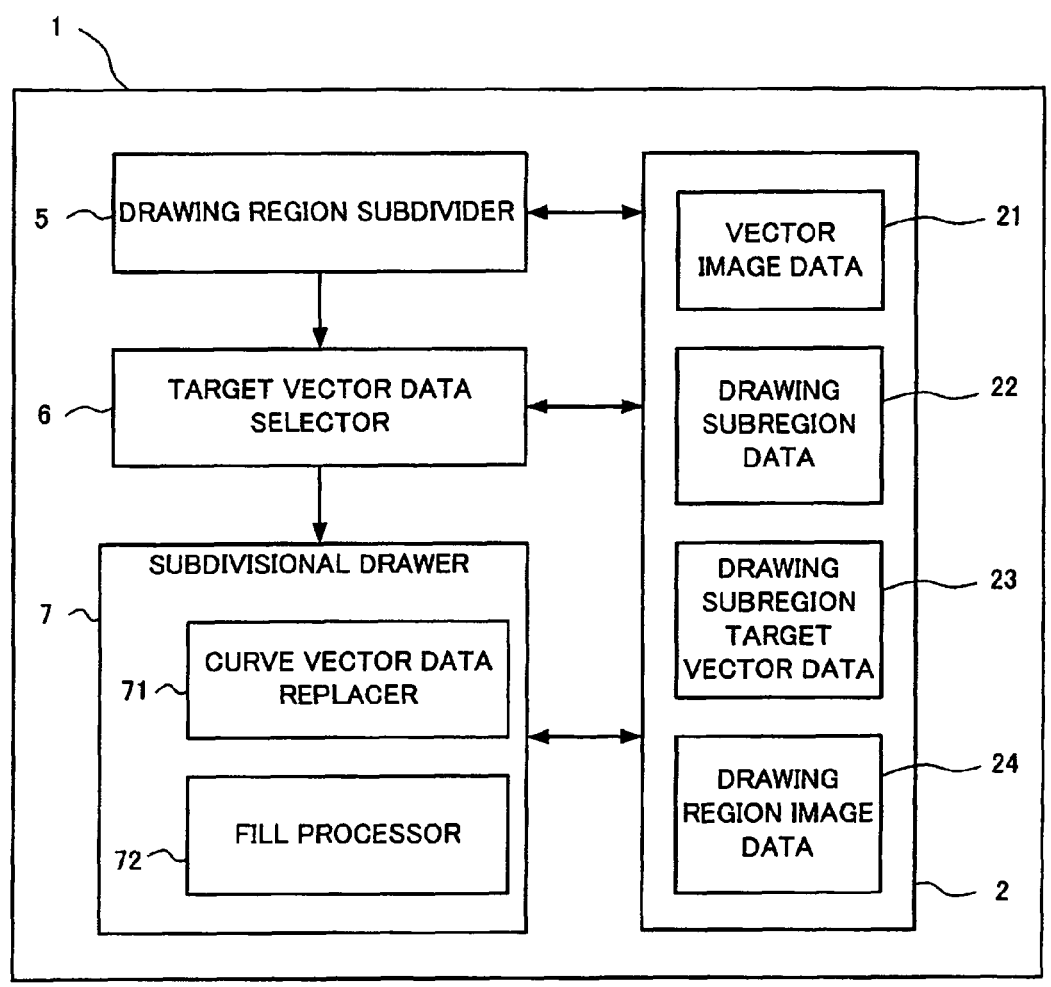
FIG. 1 is a block diagram illustrating an example of a configuration of a vector image drawing device according to an exemplary embodiment of the present invention.

Hereinafter, an exemplary embodiment of the present invention is described in detail with reference to the drawings. In the drawings, identical or corresponding portions have the same reference numerals. In this exemplary embodiment, a drawing device for converting vector data to image memory to display a vector image on an all-purpose display device is described. The drawing device may be used also in the case where a vector image is printed using a printer, etc.

FIG. 1 is a block diagram illustrating an example of a configuration of a vector image drawing device 1 according to the exemplary embodiment of the present invention.

The vector image drawing device 1 includes an image data memory 2, a drawing region subdivider 5, a target vector data selector 6, and a subdivisional drawer 7. The subdivisional drawer 7 includes a curve vector data replacer 71 and a fill processor 72.

The image data memory 2 stores vector image data 21, drawing subregion data 22, drawing subregion target vector data 23, and drawing region image data 24. The vector image data 21 includes one or a plurality of figure data consisting of vector data. The figure data included in the vector image data 21 consists of one or a plurality of vector data. Vector data may include straight lines, Bezier curves, arcs, etc. For example, a circle, specified by a center and a radius, is represented by one vector data. A polygon is represented by vector data including a plurality of straight lines.

Figure 2:
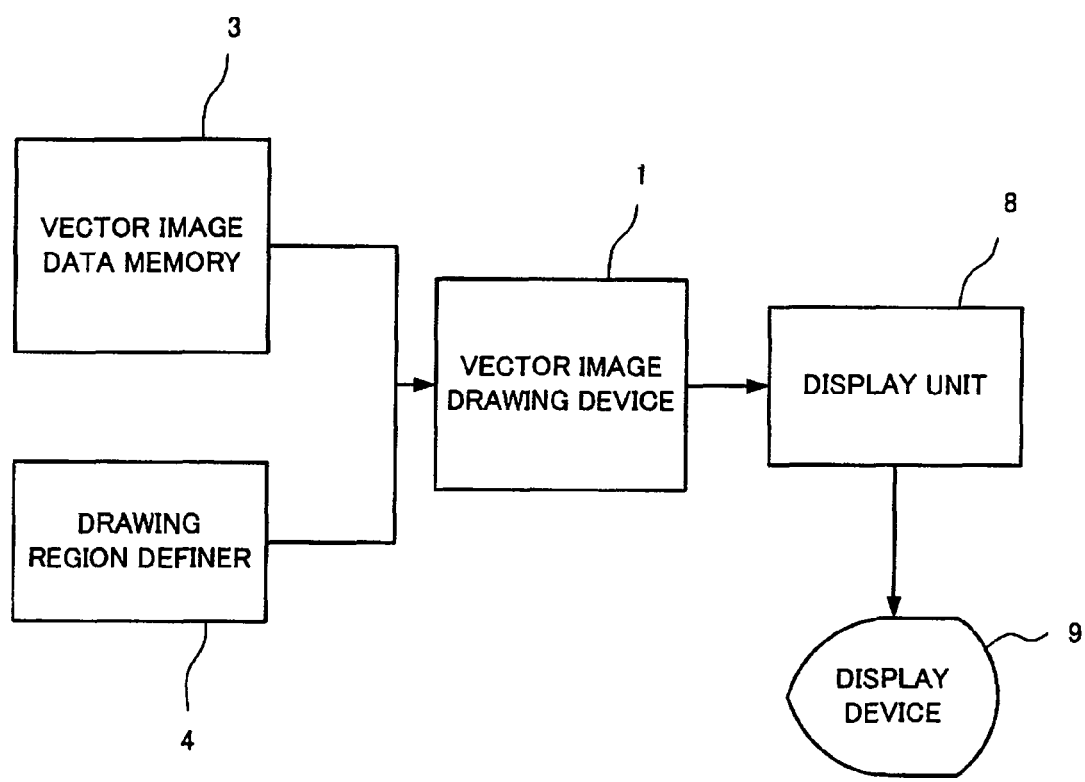
FIG. 2 is a block diagram illustrating an example of a vector image drawing system using the vector image drawing device.

FIG. 2 is a block diagram illustrating an example of a vector image drawing system using the vector image drawing device 1. The vector image drawing system includes, for example, the vector image drawing device 1, a vector image data memory 3, a drawing region definer 4, a display unit 8, and a display device 9.

The vector image data memory 3 enters vector image data into the vector image drawing device 1. The drawing region definer 4 defines a drawing region for displaying the drawing region image data 24 on the display unit 8. Normally, the drawing region is expressed by the coordinates of corners of a rectangle and a scale and/or a resolution. The display unit 8 reads the drawing region image data 24 created by the vector image drawing device 1 and displays the drawing region image data 24 on the display device 9.

Once again referring to FIG. 1, the drawing region subdivider 5 subdivides a drawing region into a plurality of drawing subregions of a predetermined size. For example, the size of one drawing subregion is defined as a rectangle having a predetermined number of pixels in the vertical and horizontal directions, such that the drawing region is subdivided into a matrix of m x n drawing subregions. In the case where the predetermined size of the drawing region is smaller than the drawing region, the drawing region is defined as one drawing subregion.

Natural numbers m and n may be provided to the drawing region subdivider 5, and the drawing region may be subdivided into a matrix of m x n drawing subregions. The size of the drawing subregions need not be uniform over the entire drawing region. For example, the sizes may be varied, such as small drawing subregions in areas of dense figures and large drawing subregions in areas of sparse figures. The drawing region subdivider 5 stores data indicating each of the drawing subregions after the subdivision in the image data memory 2 as the drawing subregion data 22.

The target vector data selector 6 selects, for each of the drawing subregions after the subdivision, vector data necessary for drawing an image of the drawing subregion.

Figure 3:
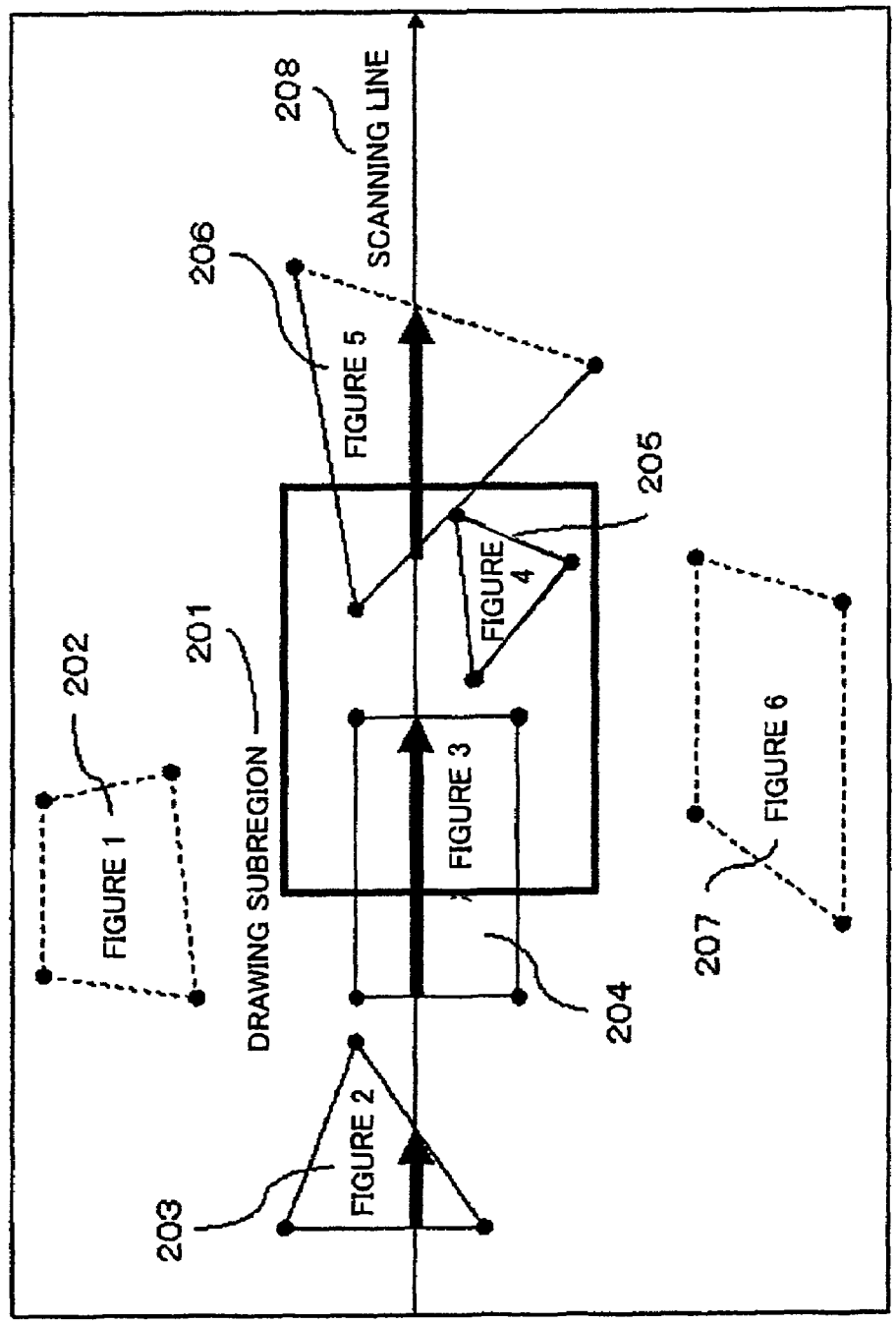
FIG. 3 illustrates an example of a relationship of a drawing subregion and figures to be drawn.

FIG. 3 illustrates an example of a relationship of a drawing subregion and a figure to be drawn within the drawing region. The example of FIG. 3 includes six FIGS. 202 through 207 in the drawing region. In FIG. 3, one drawing subregion is illustrated as a drawing subregion 201. In the example of FIG. 3, the target vector data selector 6 designates FIGS. 204, 205, and 206 included in the drawing subregion 201 as the drawing subregion target vector data 23.

All of the vector data configuring the FIG. 205 is included in the drawing subregion 201, and therefore the FIG. 205 is to be subdivisionally drawn. The FIGS. 204 and 206 are closed figures, and interiors thereof are to undergo fill processing.

During the fill processing, in the example of a scanning line 208 illustrated in FIG. 3, interiors of the FIGS. 203, 204, and 206 are filled. During the fill processing, scanning is performed in the direction of the scanning lines; a start pixel of the fill region is a point where the scanning line 208 falls on each figure, and an end pixel of the fill region is a point where the scanning line 208 exits from each figure.

In FIG. 3, the portions to be filled are indicated by thick arrows. Even in the case when a fill region is outside of the figure, the start and the end of a fill region along a scanning line are indicated by an outline of the figure. Therefore, the vector data configuring the FIGS. 204 and 206 is to be drawn to define the fill regions of the drawing subregion 201. In other words, in the case where a portion of the FIGS. 204 and 206 is inside the drawing subregion 201, all of the vector data configuring the FIGS. 204 and 206 is selected as vector data necessary for drawing the image of the drawing subregion 201.

Once again referring to FIG. 1, the target vector data selector 6 stores vector data information of the selected figures, for each of the drawing subregions, in the image data memory 2 as the drawing subregion target vector data 23. The drawing subregion target vector data 23 may represent a figure of the vector image data 21 as an indicative label. The target vector data of a figure may be specified by flags corresponding to a sequence of vector data that represents the figure.

The subdivisional drawer 7, for each of the drawing subregions after the subdivision, uses the vector data of the figures selected for each of the drawing subregions and draws an image of the drawing subregion. In other words, an image is drawn for one drawing subregion by referring to the drawing subregion target vector data 23 indicating the vector data necessary for drawing the image. For example, a drawing processing is performed by referring to the vector image data 21 based on a label and flag information included therein for indicating the figure of the vector image data 21.

The curve vector data replacer 71 replaces curve vector data to be subdivisionally drawn with straight-line vector data for the drawing subregion target vector data 23 in the case where the curve vector data is to be drawn but is outside of the drawing subregion. Furthermore, the fill processor 72 performs fill processing using the curve vector data outside of the drawing subregion to be drawn for the drawing subregion target vector data 23 that has been replaced by straight-line vector data.

Figure 4A:
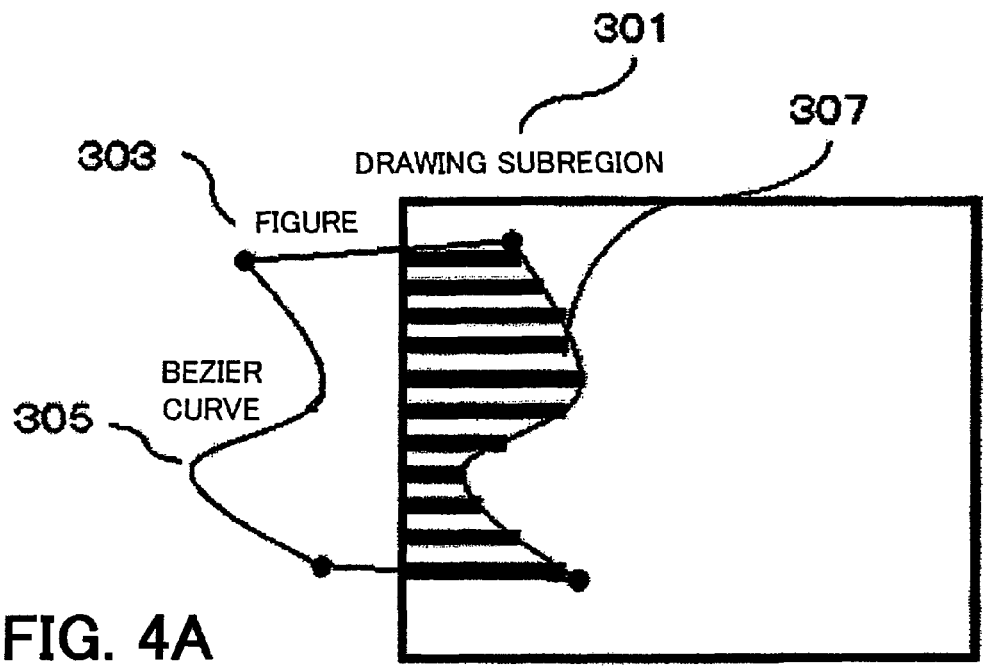
FIG. 4 illustrates a replacement of a curve vector data.
Figure 4B:
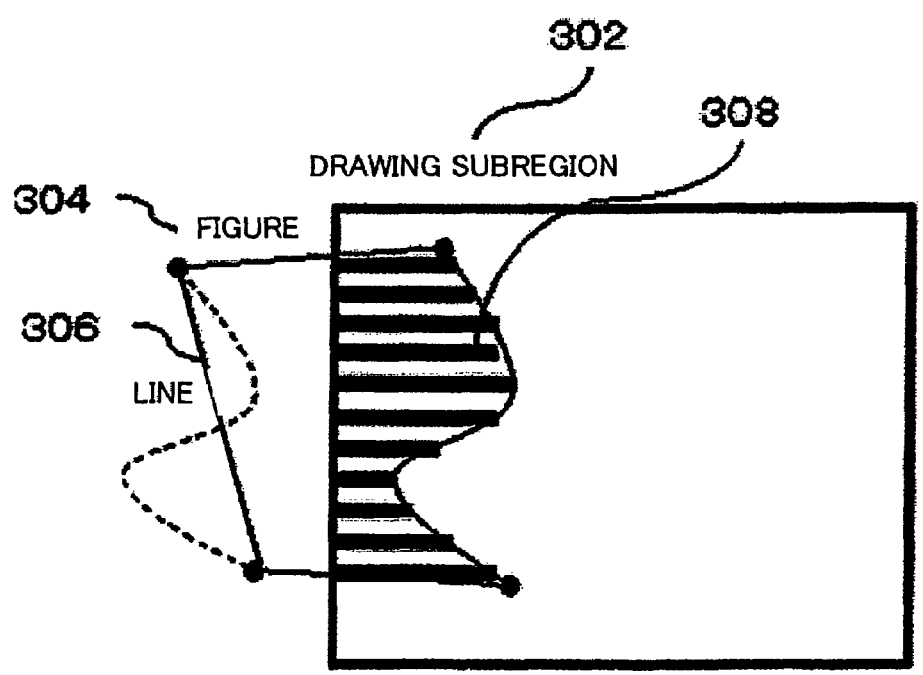

FIG. 4A and FIG. 4B illustrate a replacement of a curve vector data. FIG. 4A illustrates a relationship of an original vector data and a drawing subregion. FIG. 4B illustrates the case where a curve vector data outside of the drawing subregion is replaced by a straight-line vector data.

In FIG. 4A, a vector data outside a drawing subregion 301 of a FIG. 303 is a Bezier curve 305. In FIG. 4B, the Bezier curve 305 is replaced by a straight line 306. The FIG. 303 and a fill region 307 of the drawing subregion 301 in FIG. 4A and a FIG. 304 and a fill region 308 of a drawing subregion 302 in FIG. 4B, respectively, are identical.

For FIG. 4A, the fill processor 72 must evaluate a Bezier curve for calculating the intersections between the Bezier curve 305 and scanning lines during the drawing processing of a fill region, and therefore requires calculation time. Conversely, the straight line 306 of FIG. 4B is represented as a linear equation and requires few calculations for intersections with the scanning lines. As a result, in particular, the drawing processing of the fill region can be reduced.

In the case where curve vector data outside of the drawing subregion is replaced by straight-line vector data, the curve being replaced is not limited to a Bezier curve, and curves such as arcs and elliptic curves also may be replaced by straight lines. Replacing these lines that require many calculations with straight lines results in a reduction of the calculations of the intersections with the scanning lines. Furthermore, a plurality of connecting straight-line vector data outside of the drawing subregion also may be replaced with one straight-line vector data.

Once again referring to FIG. 1, a subdivisional drawer 7 stores the image of the entire drawing region drawn for each of the drawing subregions in the image data memory 2 as the drawing region image data 24.

Figure 5:
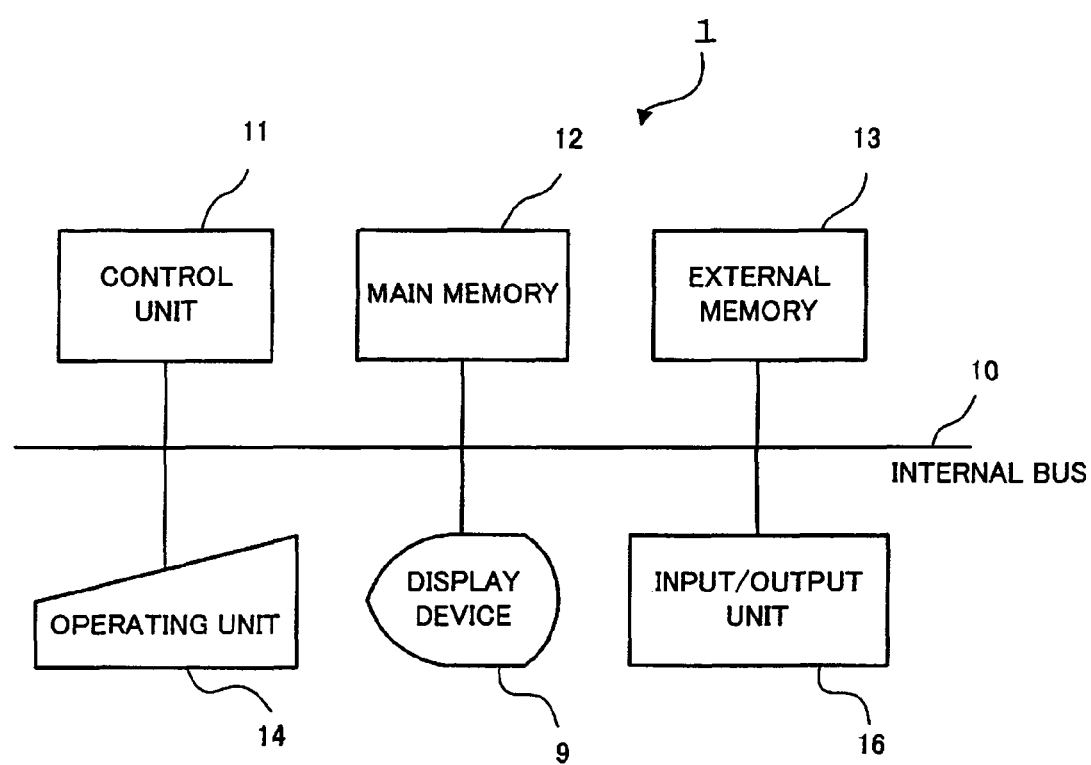
FIG. 5 is a block diagram illustrating an example of a physical configuration of the vector image drawing device according to this exemplary embodiment.

FIG. 5 is a block diagram illustrating an example of a physical configuration of the vector image drawing device 1 according to this exemplary embodiment. The vector image drawing device 1 according to the present invention may be realized using a hardware configuration similar to that of general computer devices. The vector image drawing device 1, as illustrated in FIG. 5, includes a control unit 11, a main memory 12, an external memory 13, an operating unit 14, a display device 9, and an input/output unit 16. The main memory 12, the external memory 13, the operating unit 14, the display device 9, and the input/output unit 16 all are connected to the control unit 11 via an internal bus 10.

The control unit 11 consists of a CPU (central processing unit) and the like, and follows a program stored in the external memory 13 to execute processing for drawing the vector image.

The main memory 12 consists of RAM (random access memory) and the like, loads a program stored in the external memory 13, and is used as an operating region of the control unit 11. The image data memory 2 recited above is included inside the main memory 12.

The external memory 13 consists of non-volatile memory such as flash memory, hard disk drive, DVD-RAM (digital versatile disc-random access memory), DVD-RW (digital versatile disc-rewritable) and the like, and stores in advance a program for causing the control unit 11 to perform the processing.

The operating unit 14 consists of devices such as a keyboard and a pointing device such as a mouse, and an interface device that connects the keyboard, the pointing device and the like to the internal bus 10. Via the operating unit 14, the following information is entered and supplied to the control unit 11: instructions such as those for creating, entering, sending, and receiving the vector image data; specification of the vector image to be displayed; the scope of the drawing region; the enlargement ratio; and the location of the drawing region in the display device.

The display device 9 consists of a CRT (cathode ray tube) or a LCD (liquid crystal display), and displays the drawn vector image.

The input/output unit 16 consists of a wireless transmission device, a wireless modem or network terminal equipment, and devices for connecting thereto such as serial interfaces or a LAN (local area network) interface. The vector image data may be entered or output via the input/output unit 16.

The vector image drawing device 1 according to the present invention consists of electronic circuits including hardware for implementing circuits such as LSI (large scale integrations) having embedded circuits for realizing functions for drawing the vector images recited above. Furthermore, the functions of the vector image drawing device 1 may be realized with software by the control unit 11 in a computer processing device that executes a vector image drawing program for realizing the functions recited above. In such a case, the CPU of the control unit 11 loads the vector image drawing program stored in the external memory 13 into the main memory 12 and executes it therefrom, thereby controlling the operation of each component and realizing with software the functions for drawing the vector image.

Next, operations of the vector image drawing device 1 according to this exemplary embodiment are described with reference to the flowcharts illustrated in FIG. 6 through FIG. 9. As recited above, the operations of the vector image drawing device 1 are executed by the control unit 11 and the vector image drawing program using the main memory 12, the external memory 13, the operating unit 14, the display device 9, and the input/output unit 16 as resources.

Figure 6:
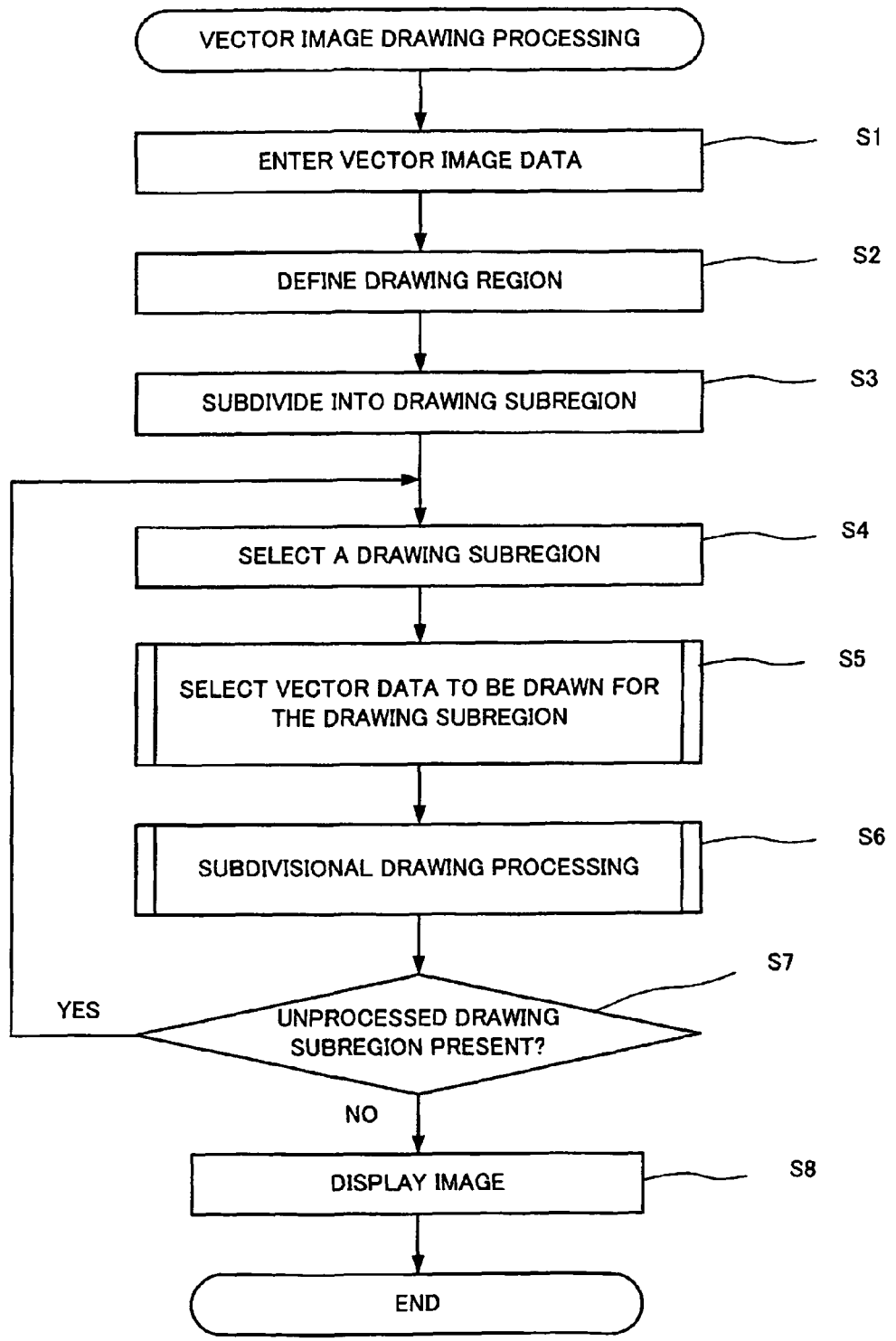
FIG. 6 is a flowchart illustrating an example of an operation of a vector image drawing processing according to the exemplary embodiment of the present invention.

FIG. 6 is a flowchart illustrating an example of an operation of a vector image drawing processing according to the exemplary embodiment of the present invention. The vector image data memory 3 enters the vector image data 21 via the input/output unit 16 in the vector image drawing device 1. The entered vector image data 21 is stored in the image data memory 2 (step S1). A drawing region definer 4 defines the drawing region, for example, following instructions entered by an operator via the operating unit 14. Alternatively, the drawing region definer 4 may define the drawing region based on predetermined information settings (step S2). The drawing region is the region of the image to be displayed on the display device 9 and includes a portion or the entirety of the vector image data 21.

The drawing region subdivider 5 subdivides the drawing region into the drawing subregions by a predetermined method (step S3). As recited above, the method for subdividing, for example, may subdivide the drawing region into a plurality of drawing subregions of a predetermined size. Alternatively, the drawing region may be subdivided into a matrix of m x n drawing subregions. The drawing subregions need not be of a uniform size over the entire drawing region.

The target vector data selector 6 selects one of the drawing subregions after the subdivision (step S4), and selects vector data of the figures in the drawing subregion (step S5). Then, the subdivisional drawer 7 uses the selected vector data of the selected figures and draws an image of the drawing subregion (step S6). The drawn image is stored in the image data memory 2 as the drawing region image data 24.

In the case where unprocessed drawing subregions remain (step S7: YES), the flow returns to step S4, and the target vector data selector 6 selects one of the unprocessed drawing subregions. In the case where the drawing processing for all of the drawing subregions is completed (step S7: NO), the display unit 8 displays the drawing region image data 24 on the display device 9 (step S8).

Figure 7:
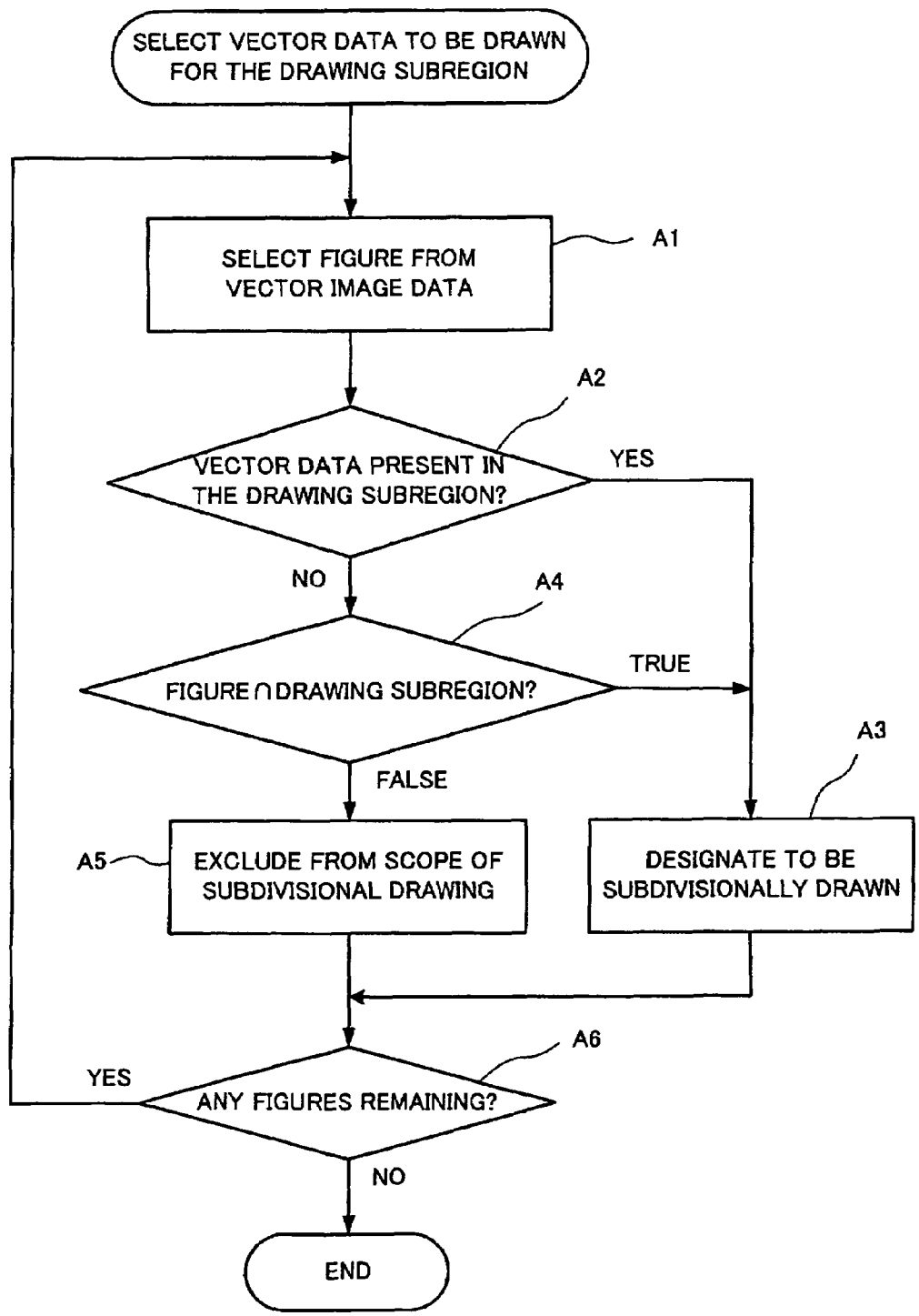
FIG. 7 is a flowchart illustrating an example of an operation for selecting drawing vector data for a drawing subregion.

FIG. 7 is a flowchart illustrating an example of a selection operation of drawing vector data for a drawing subregion. The flowchart of FIG. 7 represents the operation of step S5 illustrated in FIG. 6.

The target vector data selector 6 selects one figure from the vector image data 21 (step A1). In the case where the vector data configuring the figure exhibits a portion of the figure inside the drawing subregion (step A2: YES), the figure is designated to be subdivisionally drawn (step A3).

In step A2, in the case where no vector data of the selected figure lies at least partially in the drawing subregion undergoing the processing (step A2: NO), it is determined whether or not any pixel is common to the figure and the drawing subregion (step A4). The symbol "∩" in step A4 denotes an intersection. In the case where no common pixels are present (step A4: FALSE), the figure is excluded from the scope of the subdivisional drawing (step A5). In the case where common pixels are present (step A4: TRUE), the figure is to be subdivisionally drawn (step A3).

The determination of whether or not the selected figure is to be subdivisionally drawn for the drawing subregion can be performed roughly by the following criteria:.

(1) All of the X coordinates of the vector data configuring the figure are smaller than the minimum X coordinate of the drawing subregion.

(2) All of the X coordinates of the vector data configuring the figure are greater than the maximum X coordinate of the drawing subregion.

(3) All of the Y coordinates of the vector data configuring the figure are smaller than the minimum Y coordinate of the drawing subregion.

(4) All of the Y coordinates of the vector data configuring the figure are greater than the maximum Y coordinate of the drawing subregion.

In each of the criteria (1) through (4) recited above, the figure is excluded from the scope of the subdivisional drawing.

By the criteria recited above, figures having no pixels common with the drawing subregion such as C-shaped or U-shaped figures surrounding the drawing subregion are designated to be subdivisionally drawn. However, the determination of the scope of the subdivisional drawing is simplified, and reduced calculations for the overall vector image drawing processing can be expected.

Referring to the flowchart of FIG. 7, in the case where yet unselected figures are present in the vector image data (step A6: YES), the flow returns to step A1 and the target vector data selector 6 selects a new figure. In the case where all figures in the vector image data are selected (step A6: NO), the vector data selection processing of the drawing subregion ends.

Figure 8:
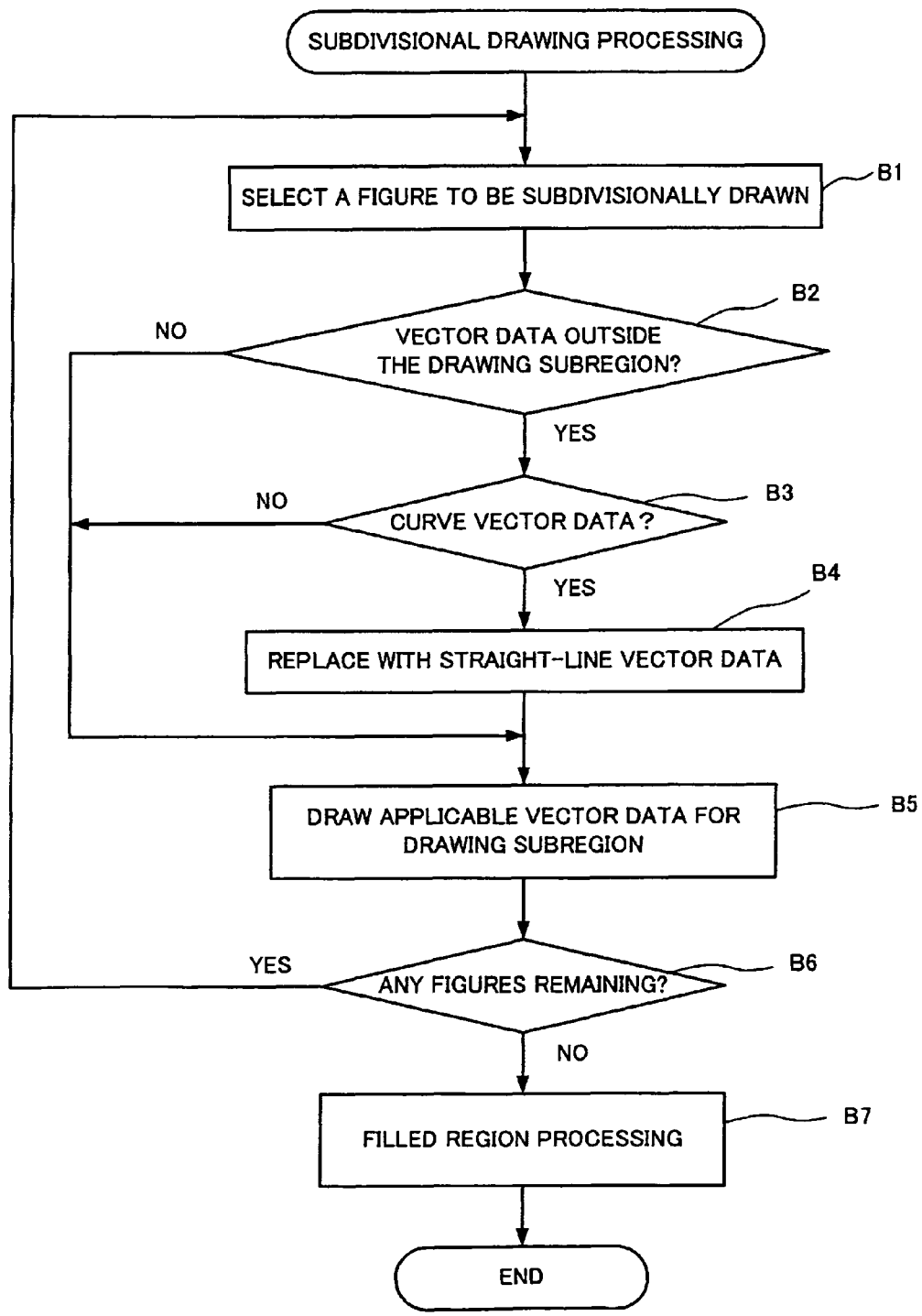
FIG. 8 is a flowchart illustrating an example of an operation of a subdivisional drawing processing.

FIG. 8 is a flowchart illustrating an example of an operation of the subdivisional drawing processing. The flowchart of FIG. 8 represents the operation of step S6 illustrated in FIG. 6.

The subdivisional drawer 7 selects one figure included in the drawing subregion target vector data 23 of the drawing subregion undergoing the processing (step B1). It is determined whether or not any vector data from the vector data configuring the figure is present outside of the drawing subregion undergoing the processing (step B2). In the case where vector data configuring the figure is present outside of the drawing subregion (step B2: YES), and in the case where the vector data is curve vector data (step B3: YES), the vector data is replaced by straight-line vector data (step B4).

In the case where the vector data of the figure is not outside of the drawing subregion (step B2: NO), or in the case where the vector data outside of the drawing subregion does not include curve vector data (step B3: NO), the vector data is not replaced.

The subdivisional drawer 7 draws the vector data of the selected figure lying at least partially in the drawing subregion (step B5). In other words, a start pixel or an end pixel of the fill region is defined based on the vector data. Then, in the case where figures include target vector data for drawing the drawing subregion (step B6: YES), the selection of a figure is repeated by returning to step B1.

In the case where the drawing of the vector data is complete for all of the figures included in the drawing subregion target vector data (step B6: NO), a fill processing is performed for the drawing subregion (step B7). The fill processing is limited to the area of the drawing subregion and the vector data to be drawn, and therefore the memory and the calculation amount necessary for such processing as the determination of overlapping areas of figures and the processing of vector data intersections and the like can be reduced.

Figure 9:
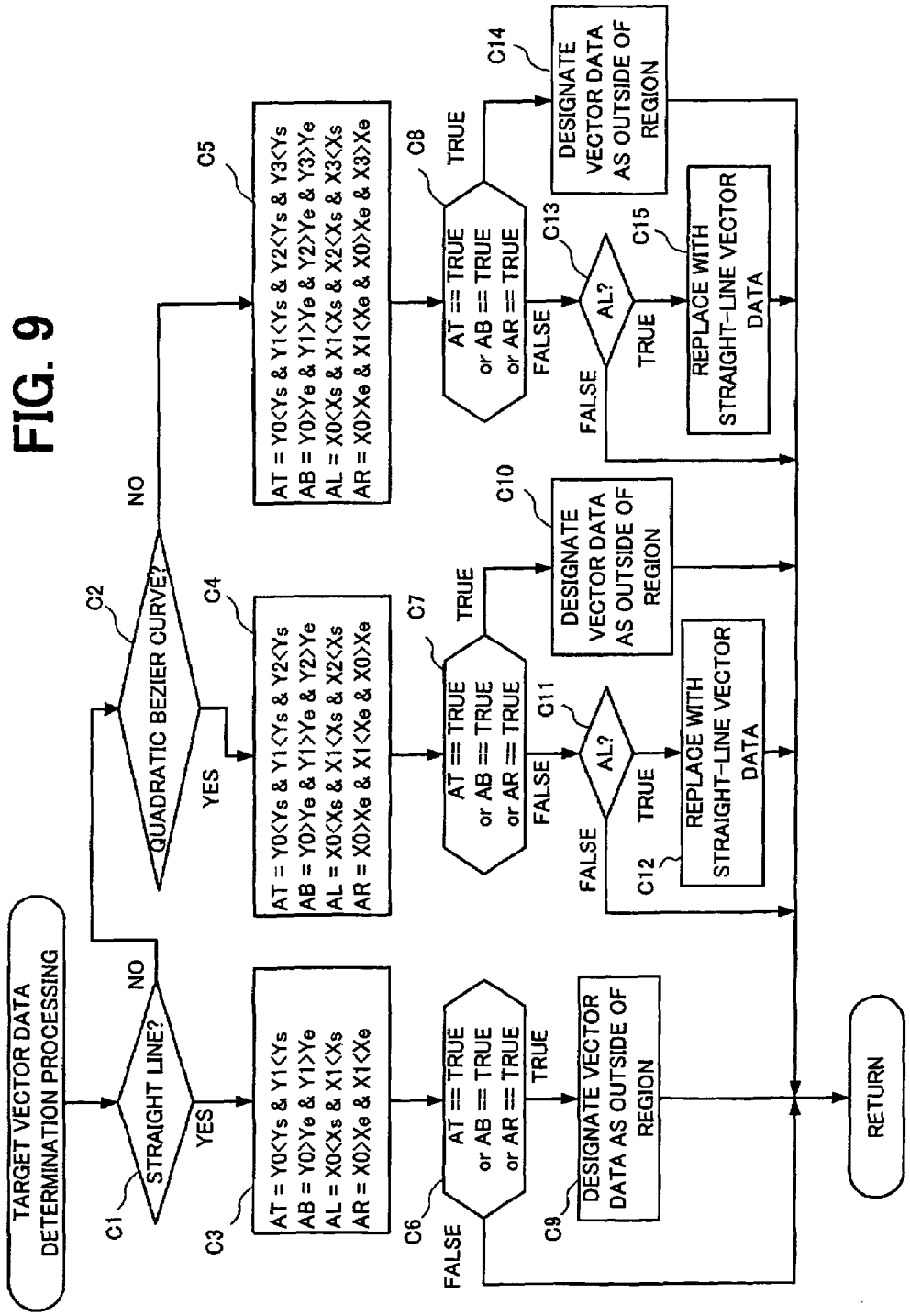
FIG. 9 is a flowchart illustrating an example of an operation of processing for determining whether or not vector data lies at least partially in the drawing subregion undergoing the processing.

FIG. 9 is a flowchart illustrating an example of an operation of processing for determining whether or not vector data lies at least partially in the drawing subregion undergoing the processing. FIG. 9 illustrates the case where the vector data includes straight lines, quadratic Bezier curves, and cubic Bezier curves.

Figure 10:
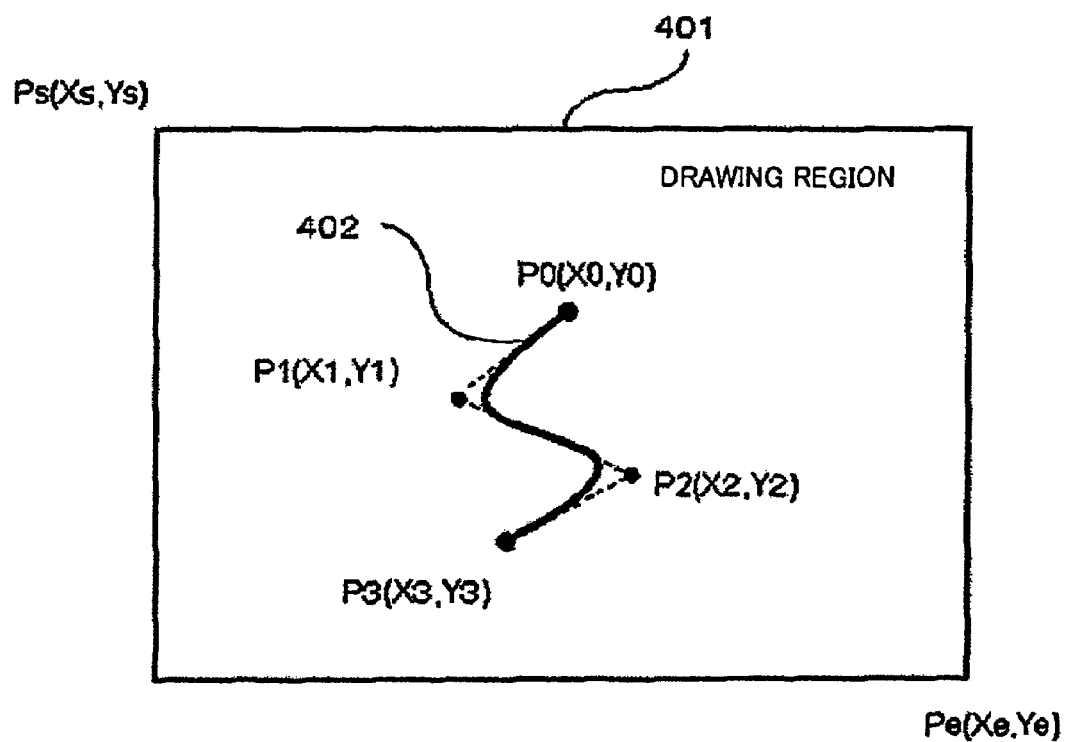
FIG. 10 illustrates an example of a drawing region and a Bezier curve.

FIG. 10 illustrates an example of a Bezier curve inside the drawing region. A Bezier curve 402 is a cubic Bezier curve specified by control points P0, P1, P2, and P3. Vector data to be determined for processing may be straight lines, quadratic Bezier curves, and the like. A vector data is specified by only P0 and P1 in the case where the vector data is a straight line. In the case of a quadratic Bezier curve, the vector data is specified by three points P0, P1, and P2. A drawing subregion 401 is defined by coordinates of a point Ps at the upper left and a point Pe at the lower right.

In the flowchart of FIG. 9, the processing of the target vector data selector 6 and the processing of the curve vector data replacer 71 are illustrated together. The target vector data selector 6 performs the processing of FIG. 9 by entering the type (Path) and the control point information P0, P1, P2, and P3 of the vector data as well as the region information Ps and Pe. First, the target vector data selector 6 discriminates whether the vector data is a straight line or a Bezier curve (step C1).

In the case where the vector data is a straight line (step C1: YES), the magnitude of coordinates P0 and P1 are compared to Ps and Pe to discriminate the location of the vector data in the drawing subregion (step C3). In the case where a condition AT (AllTop) is true (TRUE), all of the control points are above the drawing subregion 401. Similarly, the conditions AB (AllBottom), AL (AllLeft), and AR (AllRight) indicate the case where all of the control points are determined to be located below, to the left, and to the right of the drawing subregion 401, respectively. Based on the comparison result, it is discriminated whether or not the vector data relates to the drawing. As illustrated in FIG. 3, in the case where all of the control points are above, below, or beyond the right side (step C6: TRUE), the vector data is not necessary as drawing information for the drawing subregion, and therefore the vector data is designated as being outside of the drawing subregion (step C9).

In the vector data determination processing illustrated in FIG. 9, vector data to the left of the drawing subregion is not excluded and is to be drawn (filled). Such methods may be used for determining roughly and simply whether or not the vector data is to be subdivisionally drawn for the drawing subregion.

In the case where the vector data is other than a straight line (step C1: NO), it is discriminated between a quadratic Bezier curve and a cubic Bezier curve (step C2). In the case of a quadratic Bezier curve (step C2: YES), the positional relationship is discriminated between the control points configuring the quadratic Bezier curve and the drawing region (step C4). It is discriminated based on the result whether or not the vector data may be excluded (step C7). In the case where all of the control points configuring the quadratic Bezier curve satisfy at least one of the conditions AT, AB, and AR (step C7: TRUE), the vector data is excluded (step C10). In the case where the vector data is not excluded (step C7: FALSE), it is determined whether or not the condition AL is satisfied (step C11); and in the case where AL is true (step C11: TRUE), the vector data is modified into straight-line vector data (step C12). In such a case, P1 is replaced with P2.

In the processing of FIG. 9, only the Bezier curve vector data beyond the left of the drawing subregion is replaced with a straight line. Such a method may be used for replacing a curve outside of the drawing subregion with a straight line.

In the case where the vector data is a cubic Bezier curve (step C2: NO), the positional relationship between the control points P0, P1, P2, and P3 and the region information Ps and Pe is discriminated similarly to the case of a quadratic Bezier curve (step C5). Hereinafter, processing is similar to that of a quadratic Bezier curve (steps C8, C13, C14, and C15).

In this way, it is possible to determine whether or not the vector data lies at least partially in the drawing subregion, exclude the vector data that does not at least partially lie in the drawing subregion from the scope of the subdivisional drawing, or replace with a straight line the curve vector data outside of the drawing subregion.

Thus, a drawing region is subdivided into drawing subregions; a drawing processing is performed on only the vector data necessary for each of the drawing subregions; and thereby the drawing processing is performed for a vector image in the drawing region. As a result, a fill processing is limited to the area of the drawing subregion and the vector data is limited to that which is drawn, and therefore the memory and the calculation amount necessary for such processing as the determination of overlapping areas of figures and the processing of vector data intersections and the like can be reduced.

Furthermore, regarding closed figures lying at least partially in the drawing subregion, the curve vector data outside of the drawing subregion is replaced with that of a straight line, and therefore the memory and the calculation amount for the fill processing can be reduced.

The present invention is thus described above by illustration of a preferable exemplary embodiment, but the present invention need not be limited by the exemplary embodiment recited above, and the present invention may be implemented with various modifications within the scope of the technical ideas thereof. For example, this exemplary embodiment describes the case where the curve vector data is a Bezier curve, but the present invention may be implemented for other curves such as arcs or elliptic curves.

Furthermore, the configuration of the hardware and the flowcharts recited above are but one example, and any modification or revision can be made.

The vector image drawing device 1 consisting of components such as the control unit 11, the main memory 12, the external memory 13, the operating unit 14, the input/output unit 16, and the internal bus 10 need not be dedicated systems, and may be realized using a normal computer system. For example, a computer program for realizing the operations recited above may be stored in a computer readable recording medium (such as a flexible disk, CD-ROM, DVD-ROM, etc.) and installed in a computer, thereby providing the vector image drawing device 1 for performing the processing recited above. Alternatively, the computer program may be stored in a storage device of a server device in a communication network such as the internet, wherein the vector image drawing device 1 may be provided by a download by a normal computer system or the like.

Furthermore, in configurations such as the case where the functions of the vector image drawing device 1 are allotted between an OS (operating system) and an application program or realized by a cooperation between the OS and the application program, only the application program portion may be stored in a recording medium or a storage device.

Furthermore, the computer program may be superimposed on carrier waves and distributed via a communication network. For example, the computer program may be posted on a bulletin board (BBS, Bulletin Board System) in a communication network, and distributed via the network. Moreover, the computer program may be started up and executed similarly to other application programs under the control of the OS, thereby performing the processing recited above.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2007-169758 filed on Jun. 27, 2007 and including specification, claims, drawings and summary. The disclosure of the above Japanese Patent Application is incorporated herein by reference in its entirety.

What is claimed is:

1. A vector image drawing device including a processor comprising:
    a subdivider for subdividing, by the processor, a drawing region, wherein an image drawn includes one or more closed figures represented by a plurality of vector data, wherein the one or more closed figures are formed due to at least part of the one or more figures overlap each other, into an m×n matrix of drawing subregions having m rows and n columns, where each of m and n is any natural number;
    a selector for selecting, for each of the drawing subregions, vector data necessary for drawing the drawing subregion from the plurality of vector data; and
    a subdivisional drawer for drawing, for each of the drawing subregions, an image based on the vector data selected by the selector, wherein the subdivisional drawer replaces a curve vector data outside of the drawing subregion from vector data configuring a closed figure selected by the selector to be subdivisionally drawn with a straight-line vector data and performs a fill processing.

2. The vector image drawing device according to claim 1, wherein
    the subdivisional drawer, for each of the drawing subregions, replaces a plurality of connecting vector data outside of the drawing subregion from vector data configuring a closed figure selected by the selector to be subdivisionally drawn with one straight-line vector data and performs a fill processing.

3. The vector image drawing device according to claim 1, wherein
the selector, for each of the drawing subregions, excludes a vector data of the one or more closed figures selected by the selector outside of the drawing subregion from a scope of drawing by the subdivisional drawer.

4. The vector image drawing device according to claim 1, wherein
the selector, for each of the drawing subregions, designates a closed figure to be drawn by the subdivisional drawer in the case where any vector data configuring the closed figure is at least partially in the drawing subregion.

5. An electronic method for vector image drawing comprising:
a subdivision step of subdividing a drawing region by a vector image drawing device including a processor, wherein an image drawn includes one or more closed figures represented by a plurality of vector data, wherein the one or more closed figures are formed due to at least part of the one or more figures overlap each other, into an m×n matrix of drawing subregions having m rows and n columns, where each of m and n is any natural number;
a selection step of selecting, by the vector image drawing device, for each of the drawing subregions, vector data necessary for drawing the drawing subregion from the plurality of vector data; and
a subdivisional drawing step of drawing, for each of the drawing subregions, an image based on the vector data selected by the selection step, wherein the subdivisional drawing step replaces a curve vector data outside of the drawing subregion from vector data configuring a closed figure selected by the selector to be subdivisionally drawn with a straight-line vector data and performs a fill processing.

6. The electronic method for vector image drawing according to claim 5, wherein
the subdivisional drawing step, for each of the drawing subregions, replaces a plurality of connecting vector data outside of the drawing subregion from vector data configuring a closed figure selected by the selector to be subdivisionally drawn with one straight-line vector data and performs a fill processing.

7. The electronic method for vector image drawing according to claim 5, wherein
the selection step, for each of the drawing subregions, designates a closed figure to be drawn in the subdivisional drawing step in the case where any vector data configuring the closed figure is at least partially in the drawing subregion.

8. The electronic method for vector image drawing according to claim 5, wherein
the selection step, for each of the drawing subregions, excludes vector data of the one or more closed figures outside of the drawing subregion from a scope of drawing.

9. A non-transitory computer readable recording medium for recording a program that causes a computer to execute:
a subdivision step of subdividing a drawing region, wherein an image drawn includes one or more closed figures represented by a plurality of vector data, wherein the one or more closed figures are formed due to at least part of the one or more figures overlap each other, into an m×n matrix of drawing subregions having m rows and n columns, where each of m and n is any natural number;
a selection step of selecting, for each of the drawing subregions, a vector data necessary for drawing the drawing subregion from the plurality of vector data; and
a subdivisional drawing step of drawing, for each of the drawing subregions, an image based on the vector data selected by the selector, wherein the subdivisional drawing step replaces a curve vector data outside of the drawing subregion from vector data configuring a closed figure selected by the selector to be subdivisionally drawn with a straight-line vector data and performs a fill processing.

* * * * *